A. HADEN.
HORSESHOE.
APPLICATION FILED FEB. 15, 1917.

1,347,630.

Patented July 27, 1920.

Witnesses
Paul A. Viersen
E. Djaeker

Inventor
A. Haden
H. J. Sanders
By
Atty.

UNITED STATES PATENT OFFICE.

ANTON HADEN, OF CLAY CENTER, KANSAS.

HORSESHOE.

1,347,630.

Specification of Letters Patent.  Patented July 27, 1920.

Application filed February 15, 1917. Serial No. 148,838.

*To all whom it may concern:*

Be it known that I, ANTON HADEN, a citizen of the United States, residing at Clay Center, in the county of Clay and State of Kansas, have invented certain new and useful Improvements in Horseshoes, of which the following is a specification.

This invention relates to improvements in adjustable horseshoes. One object is to provide sectional horseshoes the sections of which can be readily locked in adjusted position. A further object is to provide a novel form of horseshoe that is simple in construction and cheap to manufacture.

With the foregoing and other objects in view the invention consists in the combination and arrangement of parts to be hereinafter fully described, pointed out in the appended claim and illustrated in the accompanying drawing which forms a part of this specification and in which—

Like reference characters denote corresponding parts throughout the several views.

Figure 1:
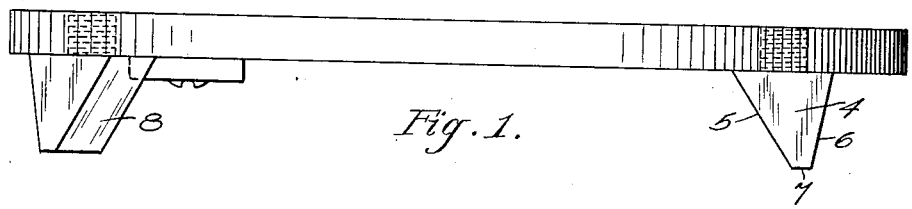
Figure 1 is a view of the horseshoe in side elevation.
Figure 2:
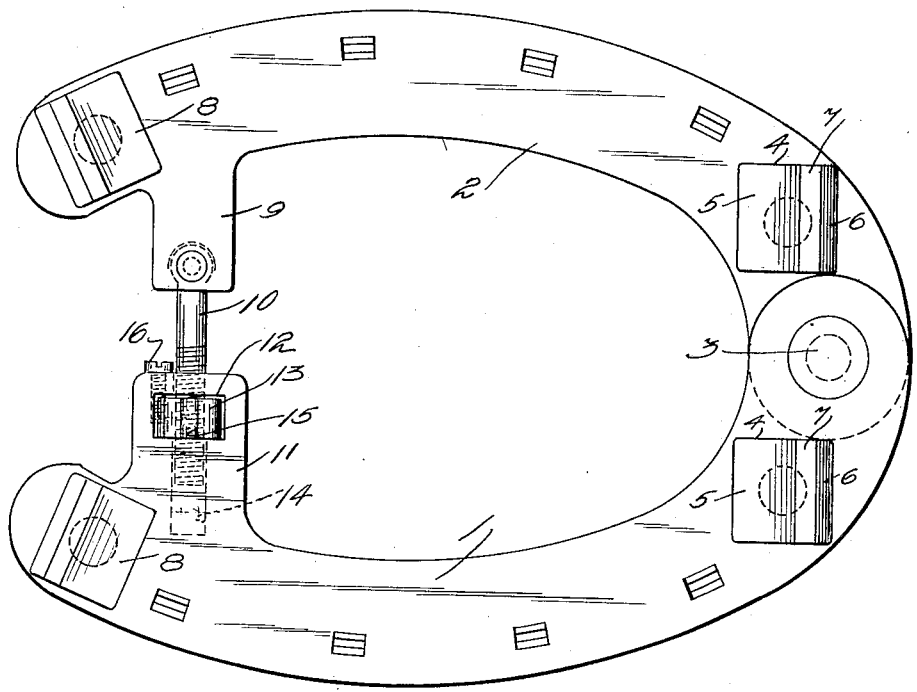
Fig. 2 is an inverted plan view of the horseshoe.
Figure 3:
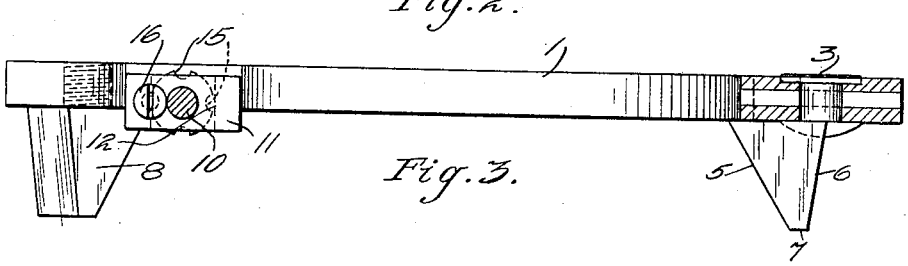
Fig. 3 is a central longitudinal sectional view of the shoe looking toward the section 1.

My improved horseshoe comprises the sections 1 and 2 pivotally connected at the toe by the pin 3. Each section is provided with a toe calk 4 having beveled faces 5, 6 and a flat tread 7 and a heel calk 8 of substantially similar construction. The heel of the section 2 is formed with an integral socket 9 in which a screw-threaded rod 10 is pivotally secured, and the heel of section 1 is formed with an integral socket 11 formed with an elongated aperture 12 in which a centrally apertured disk 13 operates, said disk being threaded to receive the rod 10 which passes into the bore 14 of said socket. The disk 13 is formed with the transverse spaced peripheral grooves 15 adapted to register singly with a screw 16 which fits into a threaded bore formed in the said socket parallel with the bore 14. The purpose of the screw 16 is to lock the disk 13 in an adjusted position. The disk 13 may be rotated by hand when the screw 16 is removed, the operator's fingers engaging with the grooved portions thereof, or a screw-driver may be inserted in the grooves 15 and used to turn the disk, which operation will adjust the shoe sections 1 and 2 with respect to each other. When the shoe sections are adjusted as desired, the screw 16 is again inserted in its bore in socket 11 and engaged with one grooved disk portion 15 and the shoe sections are thus locked in adjusted position.

What is claimed is:—

A sectional horseshoe, the sections of which are formed at their rear ends with oppositely disposed sockets, a screw-threaded rod pivotally carried by one of said sockets for projection into the second socket, said second socket being formed with an elongated aperture, a peripherally grooved adjusting disk operatively arranged upon said rod within the apertured portion of said second socket, and a screw releasably carried by said second socket for locking engagement with any one of the grooved portions of said disk.

In testimony that I claim the foregoing as my own I have hereto affixed my signature in the presence of two subscribing witnesses.

ANTON HADEN.

Witnesses:
 OTIS D. SWENSON,
 ERIC H. SWENSON.